(12) United States Patent
Lee et al.

(10) Patent No.: US 6,317,315 B1
(45) Date of Patent: Nov. 13, 2001

(54) PORTABLE COMPUTER WITH DETACHABLE DISPLAY MODULE

(75) Inventors: Chuan-Yuan Lee; Ming Yuan, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/406,130

(22) Filed: Sep. 27, 1999

(51) Int. Cl.[7] .................................. G06F 1/16; H04B 5/64
(52) U.S. Cl. ...................... 361/681; 348/836; 312/208.4; 312/7.2; 312/223.2; 16/254
(58) Field of Search ..................................... 361/680, 681, 361/683, 686; 248/917–924; 349/57, 58; 16/221, 368, 308, 341, 342, 392; 345/905, 156, 173; 312/208.4, 7.2, 223.1–223.3; 348/836

(56) References Cited

U.S. PATENT DOCUMENTS

| | | | |
|---|---|---|---|
| 5,144,290 | * | 9/1992 | Honda et al. .................... 248/917 |
| 5,195,213 | * | 3/1993 | Ohgami et al. ................... 16/342 |
| 5,229,920 | * | 7/1993 | Spaniol et al. ................... 361/680 |
| 5,262,759 | * | 11/1993 | Moriconi et al. .................. 361/681 |
| 5,507,072 | * | 4/1996 | Youn ................................. 16/261 |
| 5,724,704 | * | 3/1998 | Seo .................................. 16/254 |
| 5,745,340 | * | 4/1998 | Landau .............................. 361/681 |
| 6,006,243 | * | 12/1999 | Karidis .............................. 361/680 |
| 6,016,171 | * | 1/2000 | Tsao .................................. 361/681 |
| 6,128,184 | * | 10/2000 | Ito et al. ........................... 361/681 |
| 6,141,208 | * | 10/2000 | Hong et al. ....................... 361/681 |

FOREIGN PATENT DOCUMENTS 6-159347 * 6/1994 (JP) ................................. F16C/1/10

* cited by examiner

Primary Examiner—Gerald Tolin
Assistant Examiner—Lisa Lea-Edmonds
(74) Attorney, Agent, or Firm—Pillsbury Winthrop LLP

(57) ABSTRACT

A personal computer includes a display module and a main computer module. The display module includes a display housing having opposite lateral sides that are spaced apart from each other in a longitudinal direction, and a bottom side that is provided with an elongate first pivot axle which extends in the longitudinal direction. The bottom side is further provided with a second pivot axle having a retaining portion mounted co-axially and rotatably on the first pivot axle, and a coupling portion which extends from the retaining portion and which has a mounting member provided thereon. The main computer module includes a main housing having a top side, and a mounting block mounted on the top side of the main housing. The mounting block engages detachably the mounting member such that the display module is pivotable relative to and is detachable from the main computer module.

7 Claims, 6 Drawing Sheets

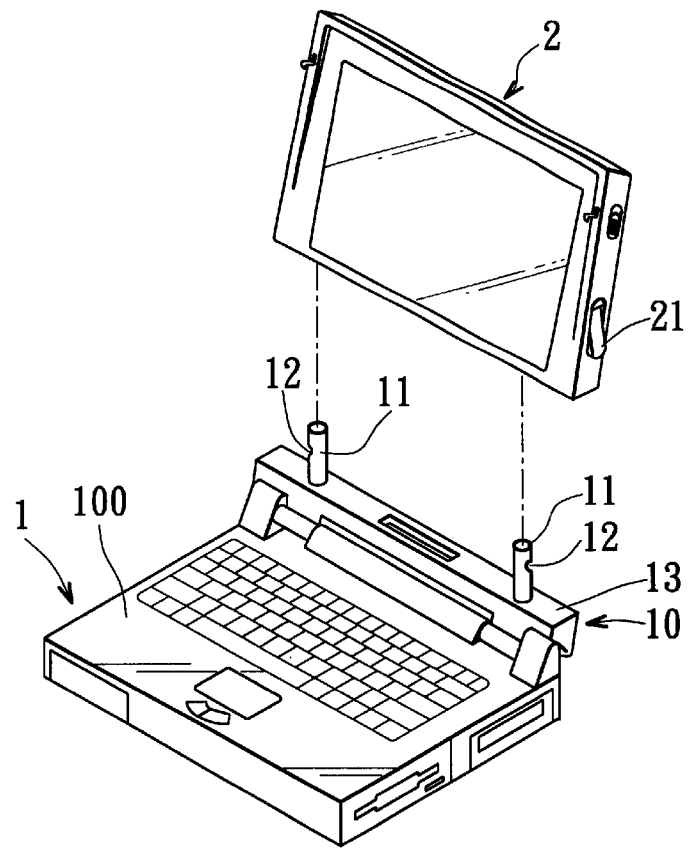
FIG. 1
PRIOR ART
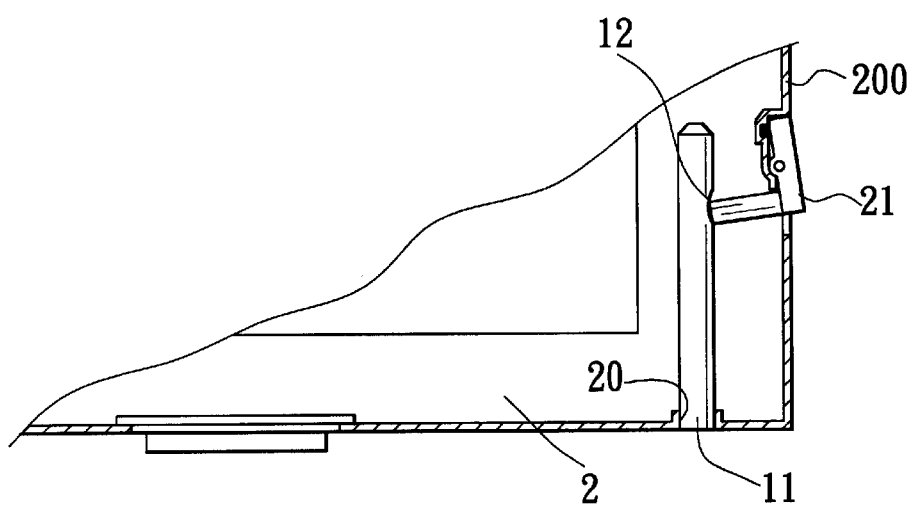
FUG. 2
PRIOR ART

PORTABLE COMPUTER WITH DETACHABLE DISPLAY MODULE

BACKGROUND OF THE INVENTION

1. Field of the Invention

The invention relates to a portable computer, such as a notebook computer, more particularly to a portable computer with a detachable display module.

2. Description of the Related Art

Currently, the display modules of notebook computers can be designed to have a screen size of more than 15 inches. As such, when operating the notebook computer, some inconvenience results in view of the relatively small distance between the computer keyboard and the display module. To overcome this drawback, it has been proposed heretofore to make the display module detachable from the main computer module and to place the display module on a display base member, thereby resulting in a stand-alone computer display. Due to the stand-alone capability of the display module, the cost of upgrading the notebook computer can be dramatically reduced since only the main computer module has to be replaced. The stand-alone capability of the display module also permits use of the latter with a desktop computer.

Referring to FIGS. 1 and 2, a conventional notebook computer is shown to include a main computer module 1 and a display module 2 mounted detachably on the main computer module 1. The main computer module 1 includes a main housing 100 and a pivot base 10. The pivot base 10 includes an elongate pivot block 13 that is mounted on a top side of the main housing 100 adjacent to a rear end of the main housing 100. The pivot block 13 is pivotable relative to the main housing 100 about a horizontal axis that extends between opposite lateral sides of the main housing 100. The pivot block 13 has opposite lateral end portions, each of which has an upright post 11 extending therefrom. Each of the upright posts 11 has a retaining notch 12 formed thereon. The display module 2 includes a display housing 200 having a bottom side formed with a pair of insert holes 20 that are aligned with the upright posts 11 to enable the latter to extend into the display housing 200. The display housing 200 further has opposite lateral sides provided with a respective retainer member 21. Each of the retainer members 21 is mounted pivotally on the display housing 200 and is movable to a locking position, where the retainer member 21 engages the retaining notch 12 of the corresponding one of the upright posts 11 to mount the display module 2 on the main computer module 1.

It is noted that the presence of the pivot block 13 on the main computer module 1 increases the size of the notebook computer. In addition, the retainer members 21 on the opposite lateral sides of the display module 2 increases the size of the latter. As shown in FIG. 3, when the display module 2 is detached from the main computer module 1 and is placed on a display base member 3 for use as a stand-alone computer display, the display base member 3 should be provided with a pivot base 10 similar to the one found on the main computer module 1, thereby complicating the configuration of the display base member 3. Furthermore, untimely removal of the display module 2 can occur due to the relatively weak engagement between the retainer members 21 and the upright posts 11.

SUMMARY OF THE INVENTION

Therefore, the object of the present invention is to provide a portable computer with a detachable display module, which is capable of overcoming the aforesaid disadvantages that are commonly associated with the above-described prior art.

According to the present invention, a personal computer comprises:

a display module including a display housing that has opposite lateral sides spaced apart from each other in a longitudinal direction, and a bottom side provided with an elongate first pivot axle extending in the longitudinal direction, the bottom side being further provided with a second pivot axle having a retaining portion mounted co-axially and rotatably on the first pivot axle, and a coupling portion which extends from the retaining portion and which has a mounting member provided thereon; and a main computer module including a main housing having a top side, and a mounting block mounted on the top side of the main housing, the mounting block engaging detachably the mounting member such that the display module is pivotable relative to and is detachable from the main computer module.

BRIEF DESCRIPTION OF THE DRAWINGS

Other features and advantages of the present invention will become apparent in the following detailed description of the preferred embodiment with reference to the accompanying drawings, of which:

FIG. 1 is an exploded perspective view illustrating a conventional notebook computer with a detachable display module;

FIG. 2 is a fragmentary sectional view illustrating the engagement between retainer members on the display module and upright posts on a pivot base of the conventional notebook computer of FIG. 1;

DETAILED DESCRIPTION OF THE PREFERRED EMBODIMENT

Figure 3:
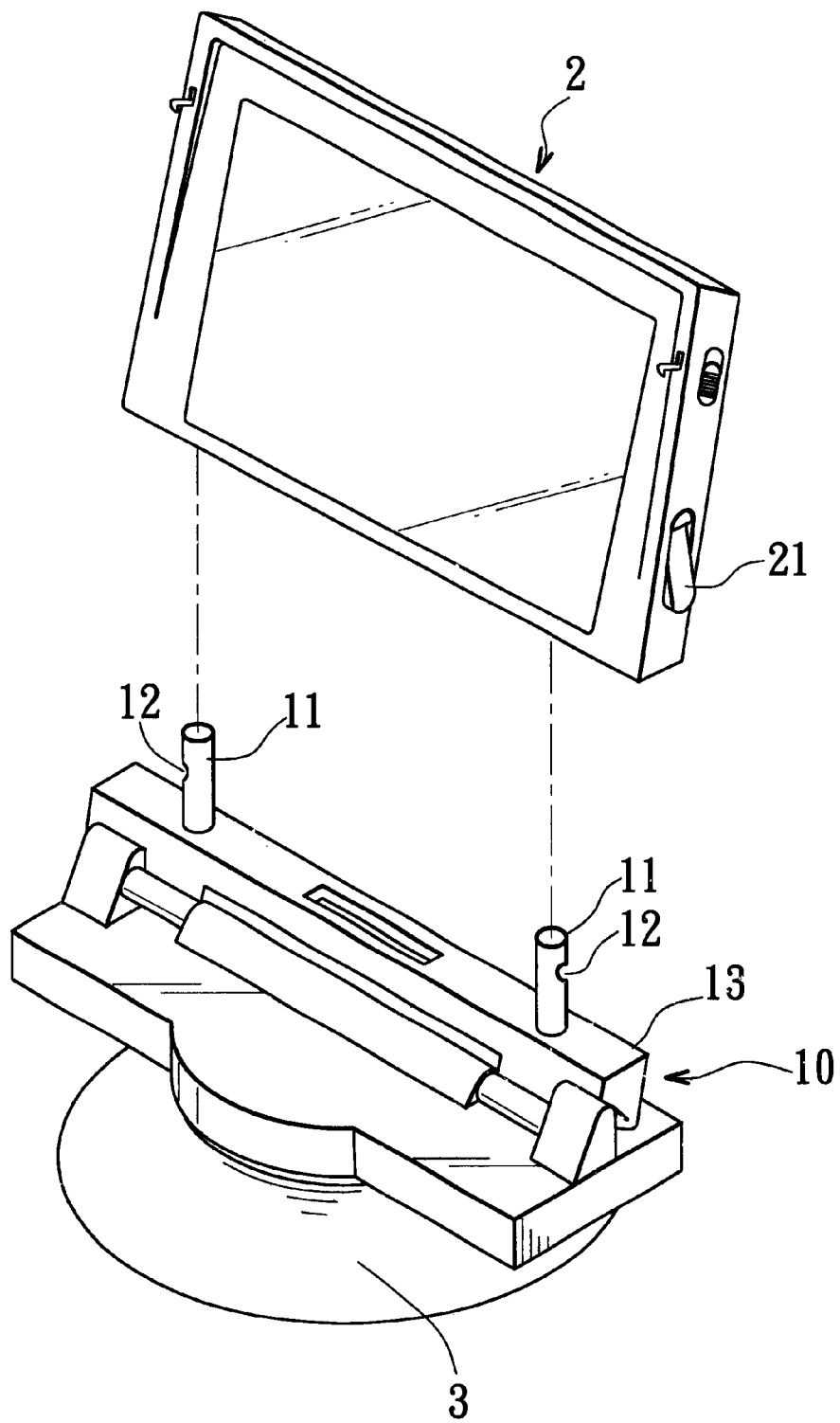
FIG. 3 is an exploded perspective view illustrating the display module and a display base member of the conventional notebook computer of FIG. 1.
Figure 5:
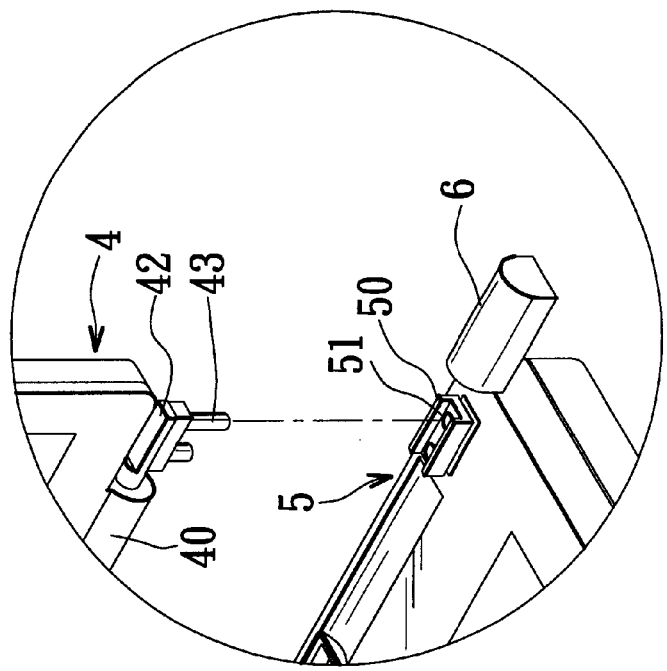
FIG. 5 is an enlarged view showing an encircled portion of FIG. 4.
Figure 4:
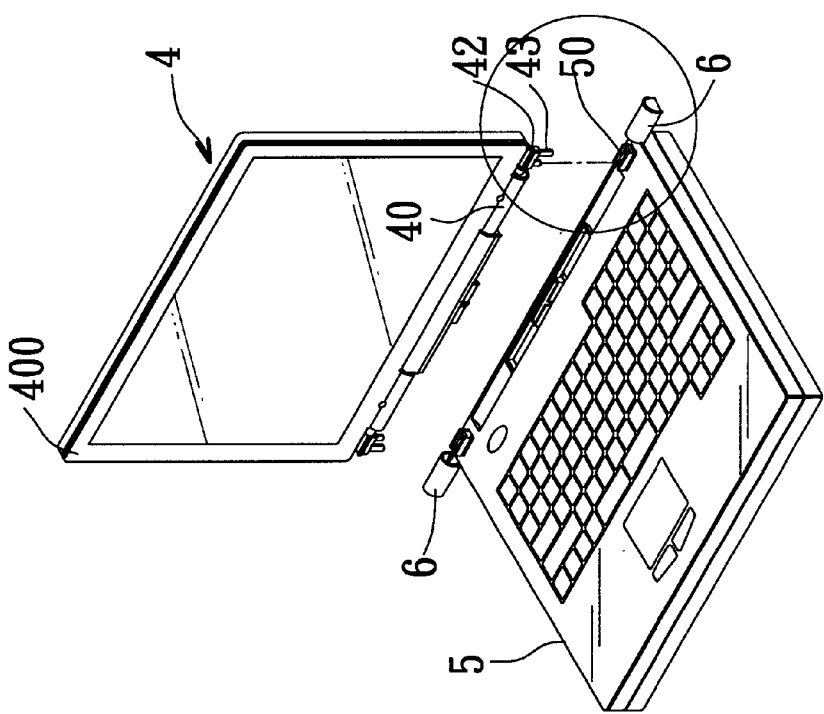
FIG. 4 is an exploded perspective view illustrating the preferred embodiment of a portable computer according to the present invention.
Figure 6:
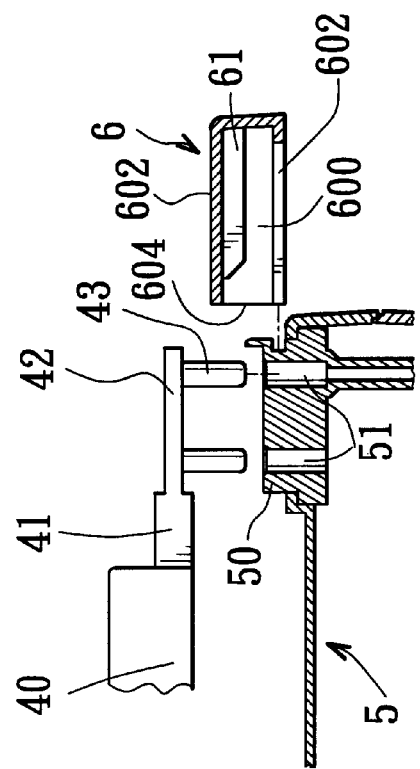
FIG. 6 is an exploded partly sectional fragmentary schematic view of the preferred embodiment.

Referring to FIGS. 4, 5 and 6, a portable computer according to the present invention is shown to be embodied in a notebook computer that includes a display module 4 and a main computer module 5.

The display module 4 is a liquid crystal display module and includes a display housing 400 that has opposite lateral sides spaced apart from each other in a longitudinal direction, and a bottom side provided with an elongate first pivot axle 40 which extends in the longitudinal direction. Each of a pair of second pivot axles 41 has a retaining portion mounted coaxially and rotatably on a respective one of two opposing ends of the first pivot axle 40, and a coupling portion 42 which extends from the retaining portion. The coupling portion 42 is formed with a mounting member in the form of a pair of insert posts 43 that depend downwardly therefrom.

The main computer module 5 is a notebook computer module and includes a main housing 500 and a pair of mounting blocks 50 mounted on a top side of the main housing 500 adjacent to a rear end of the latter. Each mounting block 50 corresponds to the coupling portion 42 of one of the second pivot axles 41, and has a top side formed with a pair of insert holes 51 that are aligned with the insert posts 43 on the corresponding second pivot axle 41. The insert holes 51 engage removably the insert posts 43 such that the display module 4 can be pivoted relative to the main computer module 4 and can be detached from the same (see FIG. 7).

Figure 9:
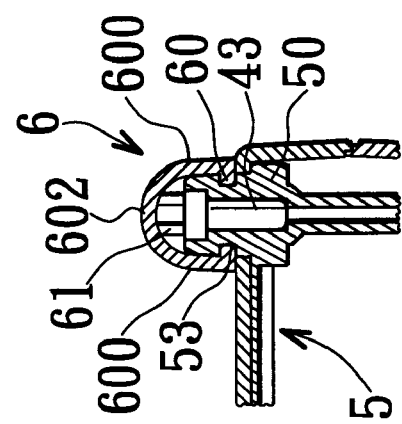
FIG. 9 is another assembled partly sectional fragmentary view of the preferred embodiment, taken along line IX—IX in FIG. 8.
Figure 8:
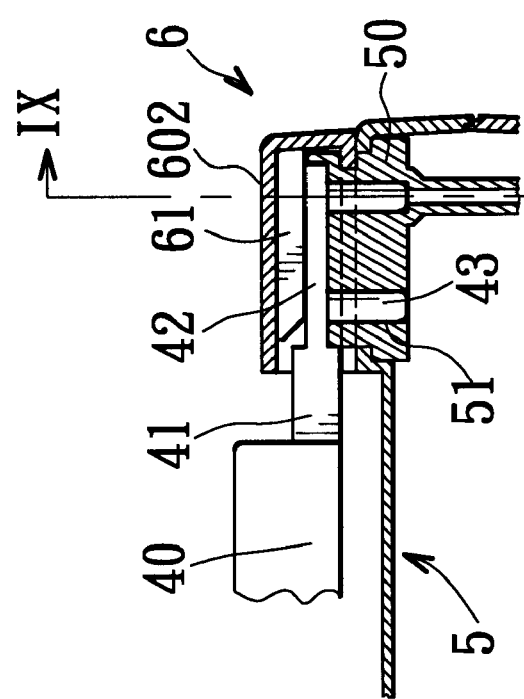
FIG. 8 is an assembled partly sectional fragmentary view of the preferred embodiment.

In the preferred embodiment, a pair of fastening members 6 are employed in order to clamp removably the coupling portion 42 of the second pivot axles 41 against the mounting blocks 50. Each mounting block 50 has opposite front and rear sides formed with a respective engaging groove 53 (see FIG. 9) that extends in the longitudinal direction. The fastening members 6 clamp the coupling portion 42 of the second pivot axles 41 against the top side of the mounting blocks 50, and engage removably the engaging grooves 53 in the front and rear sides of the respective mounting block 50, thereby preventing undesired removal of the insert posts 43 from the insert holes 51. As shown in FIGS. 8 and 9, each fastening member 6 has front and rear wall portions 600 to be disposed adjacent to the front and rear sides of the respective mounting block 50, and a top wall portion 602 bridging the front and rear wall portions 600. The front, rear and top wall portions 600, 602 cooperatively confine a holding space with an open entrance side 604 and an open bottom side 606, and impart the fastening member 6 with a generally inverted U-shaped cross-section. Each of the front and rear wall portions 600 has an inner wall surface formed with a slide projection 60 that is disposed at the open bottom side 606 and that engages slidably and removably the engaging groove 53 in the adjacent one of the front and rear sides of the respective mounting block 50. The top wall portion 602 has a press rib 61 depending downwardly therefrom for pressing the coupling portion 42 of the respective second pivot axle 41 against the top side of the corresponding mounting block 50.

Figure 7:
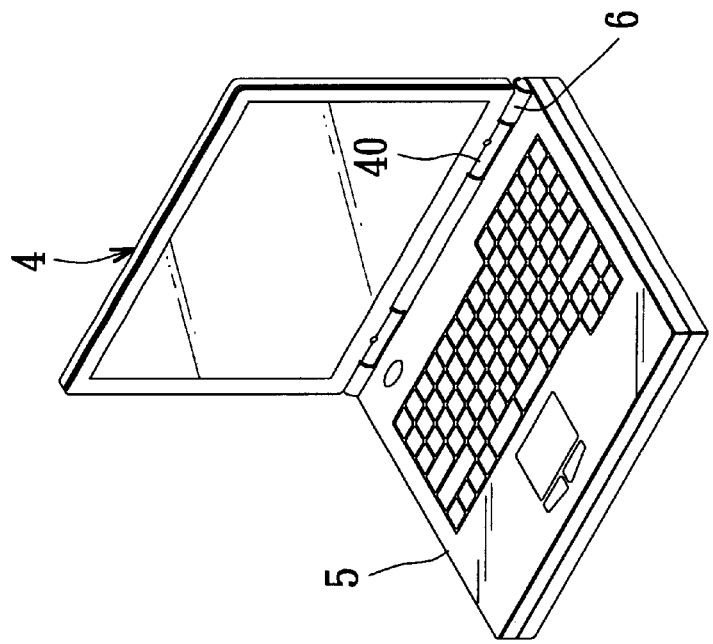
FIG. 7 is an assembled perspective view of the preferred embodiment.

Referring again to FIGS. 4, 5, 6 and 9, to detach the display module 4 from the main computer module 5, the fastener members 6 are first removed from the mounting blocks 50 by sliding the slide projections 60 out of the engaging grooves 53. The insert posts 43 are then uprooted from the insert holes 51. As shown in FIGS. 7, 8 and 9, to assemble the display module 4 on the main computer module 5, the insert posts 43 are first inserted into the insert holes 51, and the fastener members 6 are subsequently installed by sliding the slide projections 60 thereon into the engaging grooves 53 to clamp the second pivot axles 41 against the mounting blocks 50. Assembly and disassembly of the personal computer can thus be easily accomplished.

Figure 10:
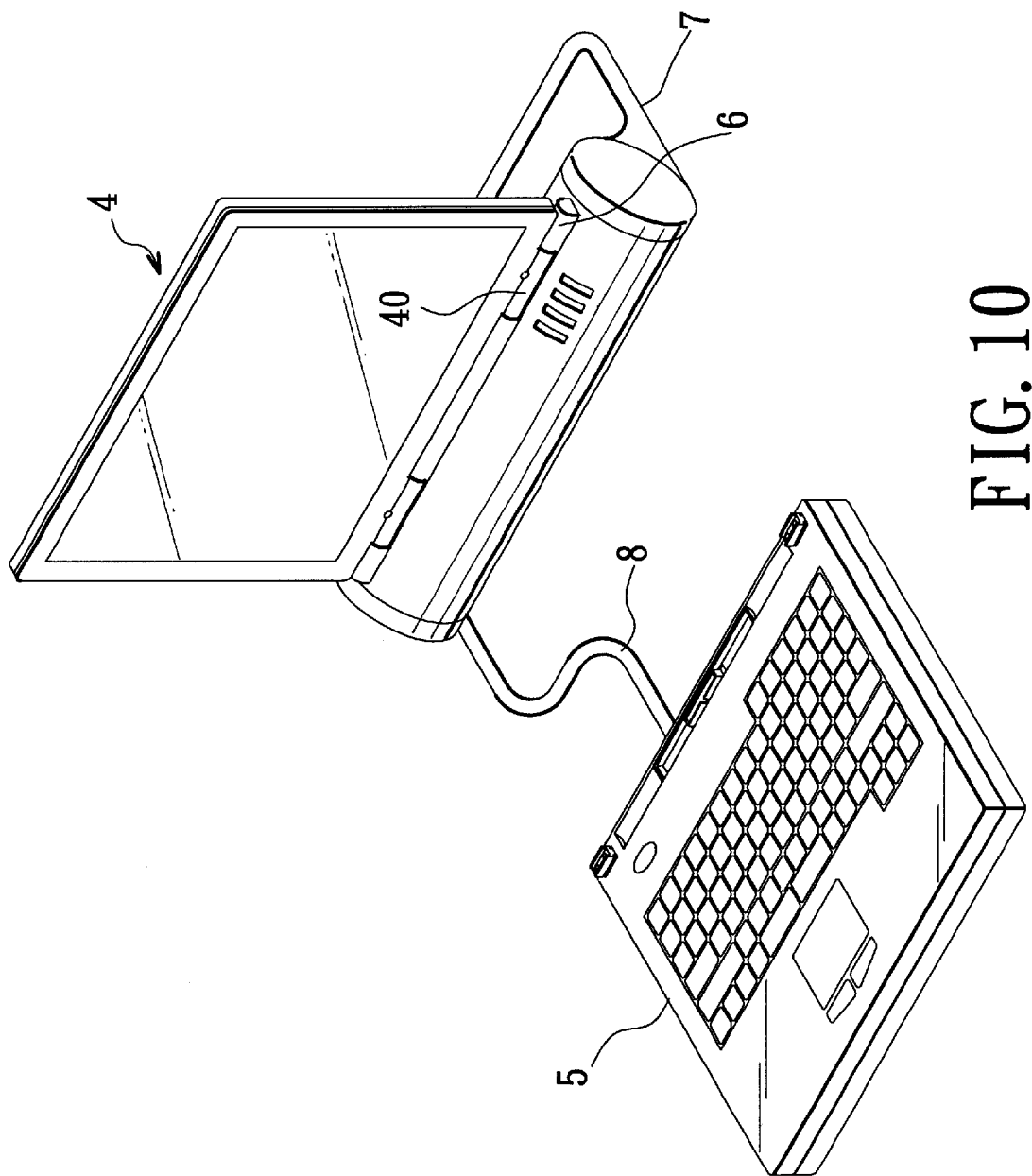
FIG. 10 is a perspective view of the preferred embodiment when used with a display base member.

Referring to FIG. 10, when the display module 4 is detached from the main computer module 5, the display module 4 can be mounted on a display base member 7 for use as a stand-alone computer display. Since the engagement between the display module 4 and the display base member 7 is similar to that between the display module 4 and the main computer module 5, a description of the same will be omitted herein for the sake of brevity. When the display module 4 is mounted on the display base member 7, a cable 8 is used to establish electrical connection between the main computer module 5 and the display module 4. As such, the position of the display module 4 relative to the main computer module 5 can be conveniently adjusted for user comfort. The cable 8 can also be used to connect the display module 4 to a desktop computer (not shown) for increased utility.

Because only a pair of mounting blocks 50 are needed on the top side of the main housing 500 of the main computer module 5 for detachable engagement with the display module 4, the size of the portable computer is not considerably increased. The fastener members 6 ensure a strong engagement between the display module 4 and the main computer module 5 to prevent undesired removal of the former from the latter without incurring an increase in the size of the display module 4. Moreover, because the pivot axles 40, 41 are provided on the display module 4, the display base member 7 can be made to have a relatively simple arrangement for mounting detachably the display module 4 thereon. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A personal computer comprising:

a display module including a display housing that has opposite lateral sides spaced apart from each other in a longitudinal direction, and a bottom side provided with an elongated first pivot axle extending in the longitudinal direction, said bottom side being further provided with a second pivot axle having a retaining portion mounted co-axially and rotatably on said first pivot axle, and a coupling portion which extends from said retaining portion and which has a mounting member provided thereon;

a main computer module including a main housing having a top side, and a mounting block mounted on said top side of said main housing, said mounting block engaging detachably said mounting member such that said display module is pivotable relative to and is detachable from said main computer module; and a fastening member for clamping removably said coupling portion of said second pivot axle against said mounting block.

2. The personal computer of claim 1, wherein said mounting member includes an insert post that depends downwardly from said coupling portion of said second pivot axle, said mounting block having a top side formed with an insert hole for engaging removably said insert post.

3. The personal computer as claimed in claim 2, further comprising a fastening member for retaining removably said coupling portion of said second pivot axle on said mounting block.

4. The personal computer as claimed in claim 3, wherein said mounting block has opposite front and rear sides, each of which is formed with an engaging groove that extends in the longitudinal direction, said fastening member clamping said coupling portion of said second pivot axle against said top side of said mounting block, and engaging removably said engaging grooves in said front and rear sides of said mounting block.

5. The personal computer as claimed in claim 4, wherein said fastening member has front and rear wall portions to be disposed adjacent to said front and rear sides of said mounting block, and a top wall portion bridging said front and rear wall portions, said front, rear and top wall portions cooperatively confining a holding space with an open entrance side and an open bottom side, said front, rear and top wall portions imparting said fastening member with a generally inverted U-shaped cross-section, each of said front and rear wall portions having an inner wall surface formed with a slide projection that engages slidably and removably said engaging groove in the adjacent one of said front and rear sides of said mounting block.

6. The personal computer as claimed in claim 5, wherein said top wall portion of said fastening portion has a press rib depending downwardly therefrom for pressing said coupling portion of said second pivot axle against said top side of said mounting block.

7. A personal computer comprising:

a display module including a display housing that has opposite lateral sides spaced apart from each other in a longitudinal direction, and a bottom side provided with an elongated first pivot axle extending in the longitudinal direction, said bottom side being further provided with a second pivot axle having a retaining portion mounted co-axially and rotatably on said first pivot axle, and a coupling portion which extends from said retaining portion and which has a mounting member provided thereon;

a main computer module including a main housing having a top side, and a mounting block mounted on said top side of said main housing, said mounting block engaging detachably said mounting member such that said display module is pivotable relative to and is detachable from said main computer module; and a display base member for mounting detachably said display module thereon when said display module is detached from said main computer module.

* * * * *